(12) United States Patent
Sekiya et al.

(10) Patent No.: US 7,958,979 B2
(45) Date of Patent: Jun. 14, 2011

(54) VARIABLE DAMPER

(75) Inventors: Shigenobu Sekiya, Saitama (JP);
Yoshitomo Azekatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 779 days.

(21) Appl. No.: 11/954,292

(22) Filed: Dec. 12, 2007

(65) Prior Publication Data
US 2008/0251982 A1 Oct. 16, 2008

(30) Foreign Application Priority Data

Jan. 5, 2007 (JP) .................. 2007-000767
Oct. 30, 2007 (JP) .................. 2007-281636

(51) Int. Cl.
*F16F 9/53* (2006.01)
*F16F 9/30* (2006.01)

(52) U.S. Cl. ..................... 188/267.2; 188/267

(58) Field of Classification Search .................. 188/267, 188/267.1, 267.2
See application file for complete search history.

(56) References Cited

U.S. PATENT DOCUMENTS

| 5,106,065 | A  | * | 4/1992  | Staton et al. ............... 267/64.11 |
| 6,260,675 | B1 |   | 7/2001  | Muhlenkamp |
| 6,311,810 | B1 | * | 11/2001 | Hopkins et al. ............ 188/267.2 |
| 6,318,519 | B1 |   | 11/2001 | Kruckemeyer et al. |
| 6,419,058 | B1 | * | 7/2002  | Oliver et al. ............... 188/267.2 |
| 6,464,051 | B2 | * | 10/2002 | Lisenker et al. ............ 188/267.2 |
| 6,612,409 | B2 | * | 9/2003  | Lun et al. .................... 188/267.2 |
| 6,637,556 | B1 |   | 10/2003 | Lun |
| 6,655,511 | B1 | * | 12/2003 | Lun et al. ...................... 188/267 |
| 6,786,311 | B2 | * | 9/2004  | Lun et al. .................... 188/267.2 |
| 2002/0185347 | A1 | * | 12/2002 | Pohl et al. ................... 188/267.2 |

* cited by examiner

*Primary Examiner* — Thomas J Williams
(74) *Attorney, Agent, or Firm* — Arent Fox, LLP (57) ABSTRACT

In a variable damper using magneto-rheological fluid that comprises a cylinder (12) filled with the fluid, a piston (16) slidably received in the cylinder and including an inner yoke (32; 62; 126), an outer yoke (31; 64, 65; 140) and a coil (34; 130), a piston rod (13) having an inner end attached to the piston and an outer end extending out of the cylinder and a magnetic valve formed in a gap between the inner and outer yokes, at least one of the outer yoke and inner yoke consisting of at least two parts that are joined to each other in an axial direction. The two piece arrangement of the inner yoke or outer yoke allows the end plates to be omitted because the gap spacer can be installed without requiring end plates, and this contributes to a compact design and a favorable damping property. Also, the manufacturing and servicing of the damper can be simplified. When end plates (134) are used, the freedom in the positioning of the coil is increased.

3 Claims, 12 Drawing Sheets

VARIABLE DAMPER

CROSS-REFERENCE TO RELATED APPLICATION

This application claims the priority of JP Application Nos. 2007-0076707, filed Jan. 17, 2007 and 2007-281636, filed Oct. 30, 2007, the entire specifications, claims and drawings of which are incorporated herewith by reference.

TECHNICAL FIELD

The present invention relates to a variable shock absorber or damper that can produce a variable damping force for use in an automotive wheel suspension system, and in particular to a variable damper that is highly compact and can vary the damping force over a wide range.

BACKGROUND OF THE INVENTION

Various forms of variable dampers have been proposed for use in wheel suspension systems for the purposes of improving the ride quality and achieving a motion stability of the vehicle. In a common conventional variable damper, a rotary valve is incorporated in the piston for varying an effective area of an orifice that communicates the two chambers on either side of the piston with each other, and such a rotary valve is typically actuated mechanically by using a suitable actuator. More recently, it has become more common to use magneto-rheological fluid for the actuating fluid of the damper, and control the viscosity of the fluid by supplying corresponding electric current to a magnetic valve which is incorporated in the piston. According to such an arrangement, the overall structure can be simplified, and the response property of the damper can be improved. See U.S. Pat. No. 6,260,675, for instance.

The piston of the damper disclosed in U.S. Pat. No. 6,260,675 comprises a cylindrical inner yoke, a coil wound around the outer periphery of the inner yoke, a pair of end plates placed on either axial end of the inner yoke, and a cylindrical outer yoke coaxially surrounding the inner yoke and end plates. The inner yoke and outer yoke are both made of magnetic material, and are retained in a spaced apart relationship by the end plates so as to define an annular flow passage between them. The end plates typically consist of disks made of non-magnetic material, and are each provided with a plurality of arcuate slots communicating with the annular passage, an annular recess for engaging a projection on the corresponding axial end of the inner yoke and an annular groove for engaging a ring that secures the inner end of the piston rod to the piston. The inner yoke, end plates and outer yoke are securely attached to one another by crimping each axial end of the outer yoke against the peripheral edge of the corresponding end plate.

In such a damper, it is desired to minimize the overall size of the damper. It is also desired to maximize the dynamic range of the damping force that can be produced by the damper. In maximizing the dynamic range of the damping force, it is beneficial to minimize the damping force that is produced when the coil is de-energized. It can be accomplished in various different ways, but reducing the axial length of the piston is one of the most effective ways.

In this regard, the damper disclosed in U.S. Pat. No. 6,260,675 requires a pair of end plates that have a relatively large thickness, and this prevents the compact design of the damper and the minimization of the flow resistance of the flow passage extending through the piston. Furthermore, the damper disclosed in U.S. Pat. No. 6,260,675 requires the outer yoke to be crimped onto the end plates, and this requires special tooling in the manufacturing line and makes the servicing of the damper extremely difficult.

U.S. Pat. No. 6,637,556 and U.S. Pat. No. 6,318,519 disclose dampers in which the piston is formed with axial grooves along the outer circumferential surface thereof to the end of minimizing the damping force when the coil is de-energized and optimizing the damping force in relation to the piston speed.

Another desirable attribute of a damper is a high responsiveness which can be accomplished by minimizing the inductance of the coil. In the conventional dampers mentioned above, because the coil is located immediately adjacent to the inner circumferential surface of the gap or flow passage in the piston, the coil is given with a high inductance, and this was found to be detrimental to achieving a favorable response of the damper.

BRIEF SUMMARY OF THE INVENTION

In view of such problems of the prior art, a primary object of the present invention is to provide a variable damper which can be made highly compact without impairing the performance of the damper.

A second object of the present invention is to provide a variable damper which can vary the damping force thereof over a wide range.

A third object of the present invention is to provide a variable damper which can minimize the damping force when the coil is de-energized.

A fourth object of the present invention is to provide a variable damper which is highly responsive to a command input, and is therefore capable of a favorable operation.

A fifth object of the present invention is to provide a variable damper which is easy to assemble and service.

According to the present invention at least some of the objects can be accomplished by providing a variable damper, comprising: a cylinder filled with magnetic fluid or magneto-rheological fluid therein and having an end connected to one of a vehicle side member and a wheel side member; a piston slidably received in the cylinder to separate an interior of the cylinder into two chambers and provided with a flow passage communicating the two chambers; and a piston rod extending out of an end of the cylinder remote from the one end thereof, and having an outer end connected to the other of the vehicle side member and the wheel side member and an inner end connected to the piston; the piston comprising a cylindrical outer yoke defining an outer peripheral part of the piston, an inner yoke coaxially received in the outer yoke at a prescribed gap and a coil retained in the inner yoke to provide a magnetic flux extending across the gap, the gap providing at least a part of the flow passage; at least one of the outer yoke and inner yoke consisting of at least two parts that are joined to each other in an axial direction.

The two piece arrangement of the inner yoke or outer yoke allows the end plates to be omitted because the gap spacer can be installed without requiring end plates, and this contributes to a compact design and a favorable damping property. Also, the manufacturing and servicing of the damper can be simplified.

If the inner yoke consists of at least two parts that are joined to each other in an axial direction, the piston may include a plurality of discrete gap spacers that are interposed between the inner yoke and outer yoke and clamped in position by joining the two parts of the inner yoke. In particular, if the two parts of the inner yoke jointly define an hourglass-shaped profile including a pair of substantially conical surfaces, and the outer yoke defines a substantially complementary inner circumferential surface opposing the outer profile of the inner yoke at a prescribed gap, the axially middle part of the outer yoke can be given with a large wall thickness without affecting the remaining part, and this enables a strong magnetic flux to be produced in the gap without causing a magnetic saturation in the outer yoke. Also, this contributes to the reduction in the diameter of the coil, and this reduces the generation of heat from the coil.

According to a preferred embodiment, the piston further comprises a pair of end plates provided on either axial end of the inner yoke, and the outer yoke is clamped between outer peripheral parts of the end plates in a coaxial and spaced relationship to the inner yoke. This allows the outer yoke and inner yoke to be joined to each other without requiring any special tooling because the clamping can be accomplished by using a piston sleeve which is crimped against the end plates or if desired by using other fastening means such as axial threaded bolts, rivets or any other known fastening means.

Typically, the coil is received in an annular groove defined in an axially middle part of an outer circumference of the inner yoke. If the inner yoke comprises at least one axial extension extending from a side of the annular groove along an outer peripheral part of the coil, the magnetically ineffective part such as the part surrounding the coil can be minimized and this improves the magnetic efficiency and permits the reduction in the axial length of the piston. The reduction in the axial length of the piston is beneficial not only for a compact design but also minimization in the damping force when the coil is not energized owing to the reduction in the flow resistance to the MRF. Also, the coil can be positioned substantially more radially inwardly from the outer circumferential surface of the inner yoke as compared to other embodiments or the prior arrangements, and this also contributes to a favorable response through a reduced inductance.

If the piston is provided with a bypass passage and a temperature sensitive valve provided in the bypass passage to open the bypass passage only when temperature of the fluid is lower than a prescribed level, the damping property of the damper can be optimized at all times including the time when the surrounding temperature is low and the MRF demonstrates a higher viscosity at such a time.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
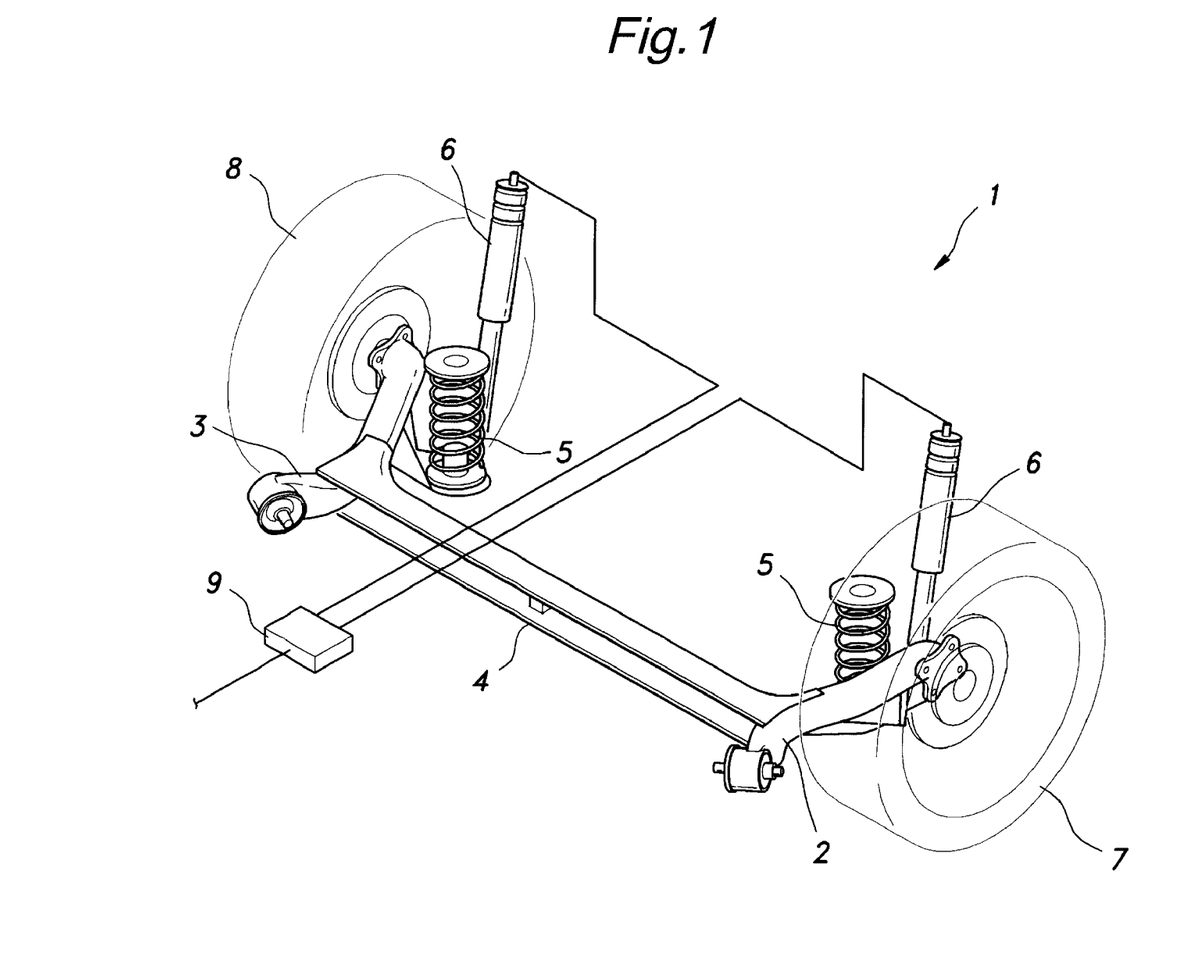
FIG. 1 is a perspective view of a rear wheel suspension system to which the present invention is applied.

FIG. 1 shows a rear wheel suspension system 1 consisting of a H-shaped torsion beam suspension system to which the present invention is applied. This suspension system comprises a pair of trailing arms 2 and 3, a torsion beam 4 connecting intermediate parts of the trailing arms 2 and 3 with each other, a pair of coil springs 5 serving as suspension springs for the corresponding trailing arms, respectively, and a pair of dampers 6 for the corresponding trailing arms. Each damper 6 consists of a variable damping force damper using MRF (Magneto-Rheological Fluid), and is configured to vary the damping force thereof under the control of an ECU 9 mounted in a car trunk or the like.

Figure 2:
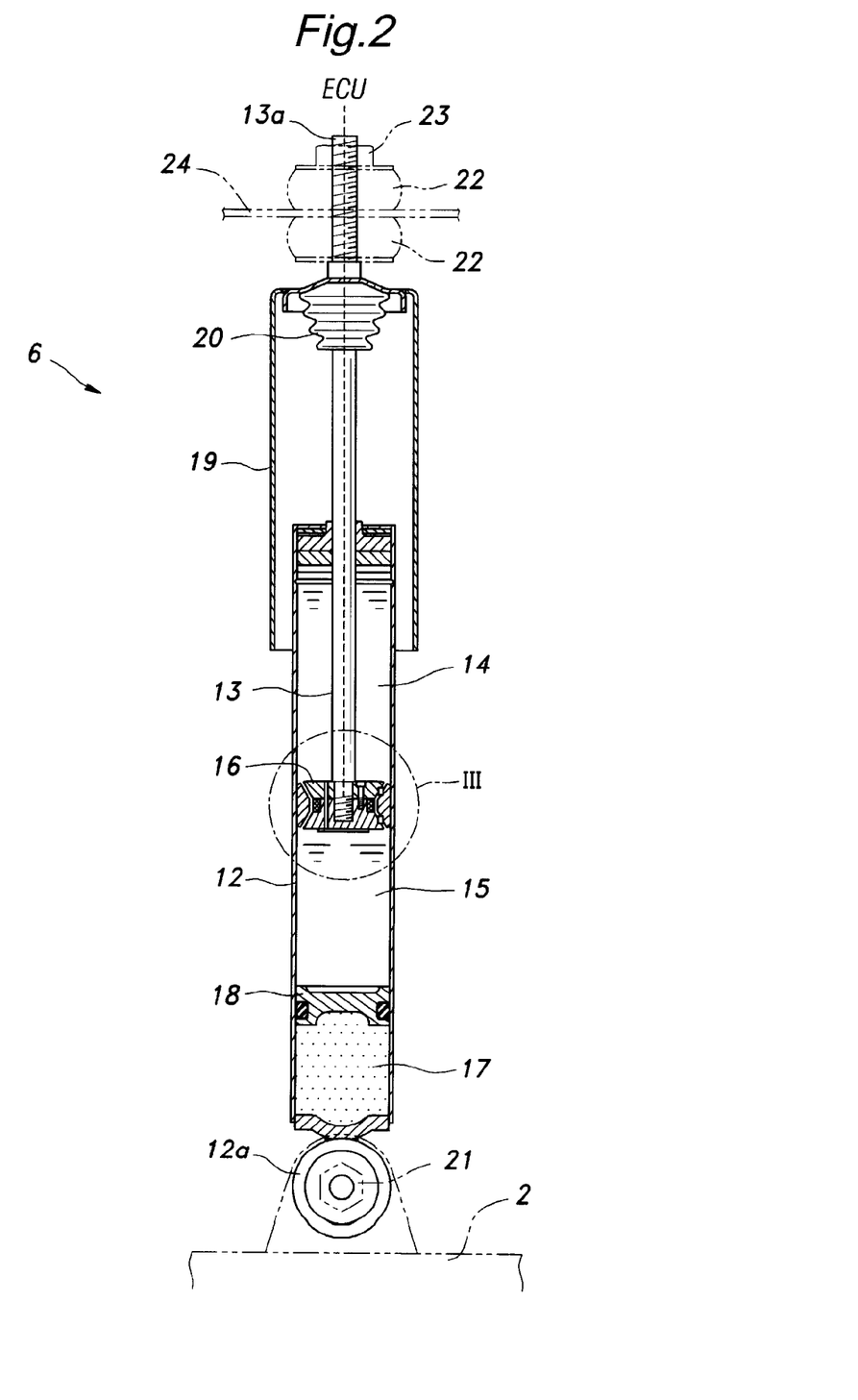
FIG. 2 is a vertical sectional view of a first embodiment of the variable damper according to the present invention.

As shown in FIG. 2, the damper 6 of the illustrated embodiment consists of a mono-tube type comprising a cylindrical cylinder 12 filled with MRF, a piston rod 13 extending out of the cylinder 12 in a slidable manner, a piston 16 attached to the inner end of the piston rod 13 and separating the interior of the cylinder 12 into an upper chamber 14 and a lower chamber 15, a free piston 18 defining a high pressure gas chamber 17 in a lower part of the cylinder 12, a cylindrical cover 19 having a larger inner diameter than the outer diameter of the cylinder 12 and attached to the piston rod 13 in a coaxial relationship to protect the piston rod 13 from contamination, and a bump stopper 20 attached to the piston rod 13 to define the limit of the movement of the damper 6 at the time of full bound in a resilient manner.

The lower end of the cylinder 12 is connected to a bracket formed in the upper surface of the corresponding trailing arm 2, 3 via a bolt 21 passed through the bracket and an eyepiece 12a formed in the lower end of the cylinder 12. The upper end of the piston rod 13 is provided with a threaded portion 13a which is connected to a damper base 24 (formed in an upper part of a wheel house) via a pair of rubber bushes 22 interposing a damper base member and a nut 23 threaded onto the piston rod 13.

Figure 3:
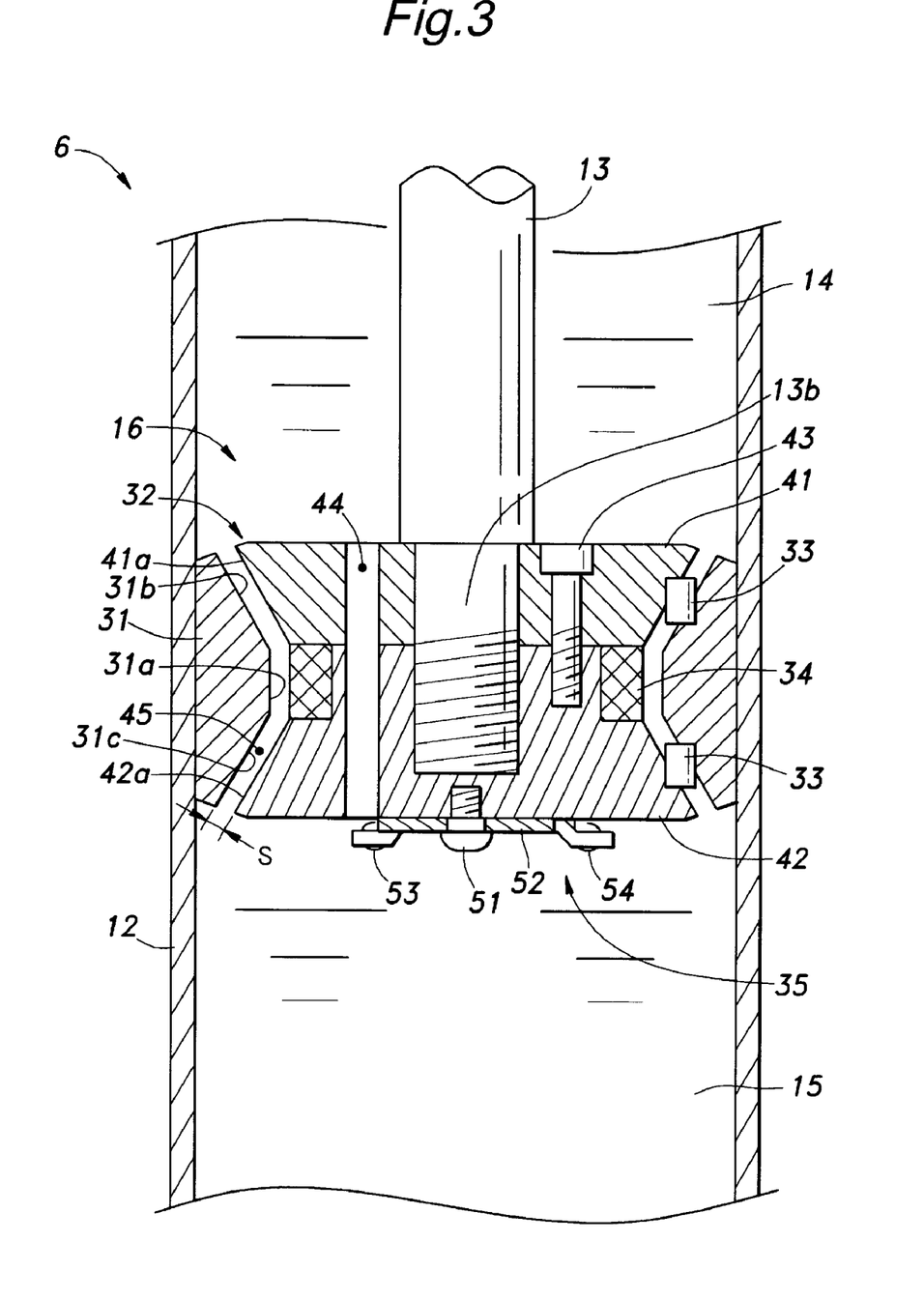
FIG. 3 is an enlarged view of a part of FIG. 2 indicated by III.
Figure 4:
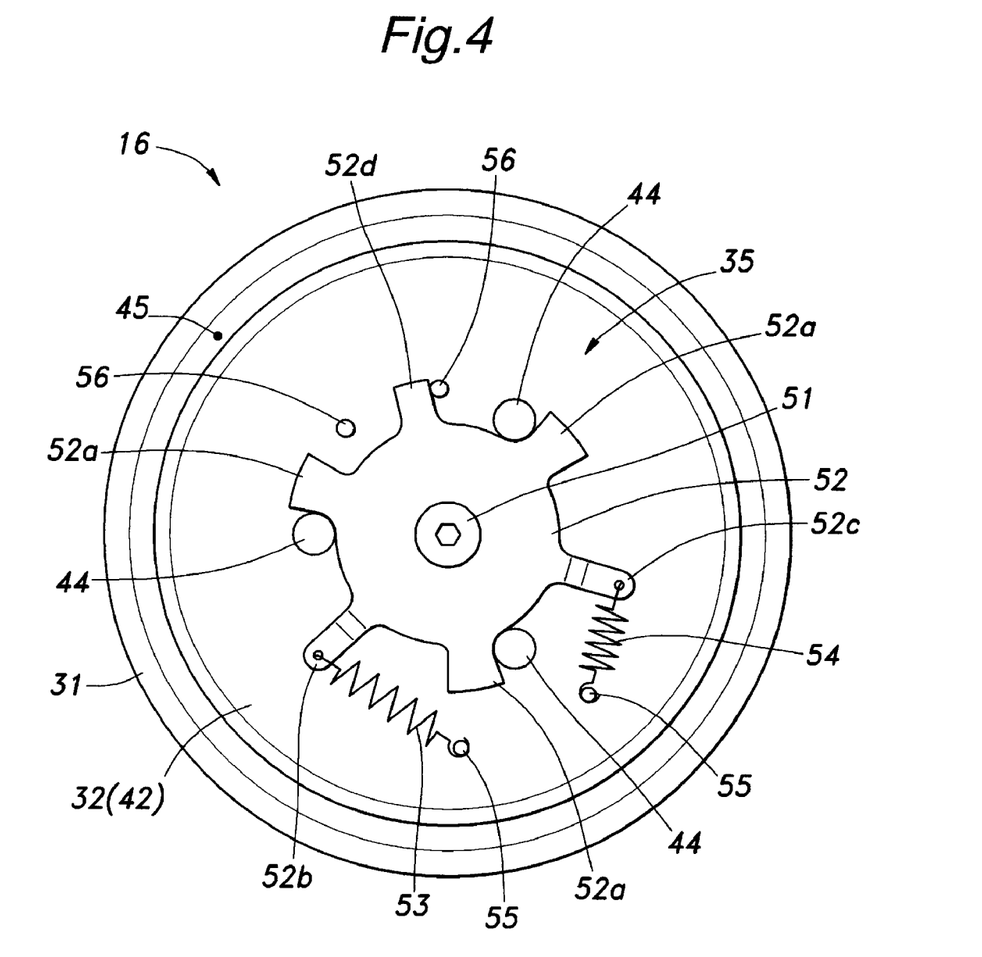
FIG. 4 is a bottom view of the piston of the first embodiment when the temperature sensitive valve is open.
Figure 5:
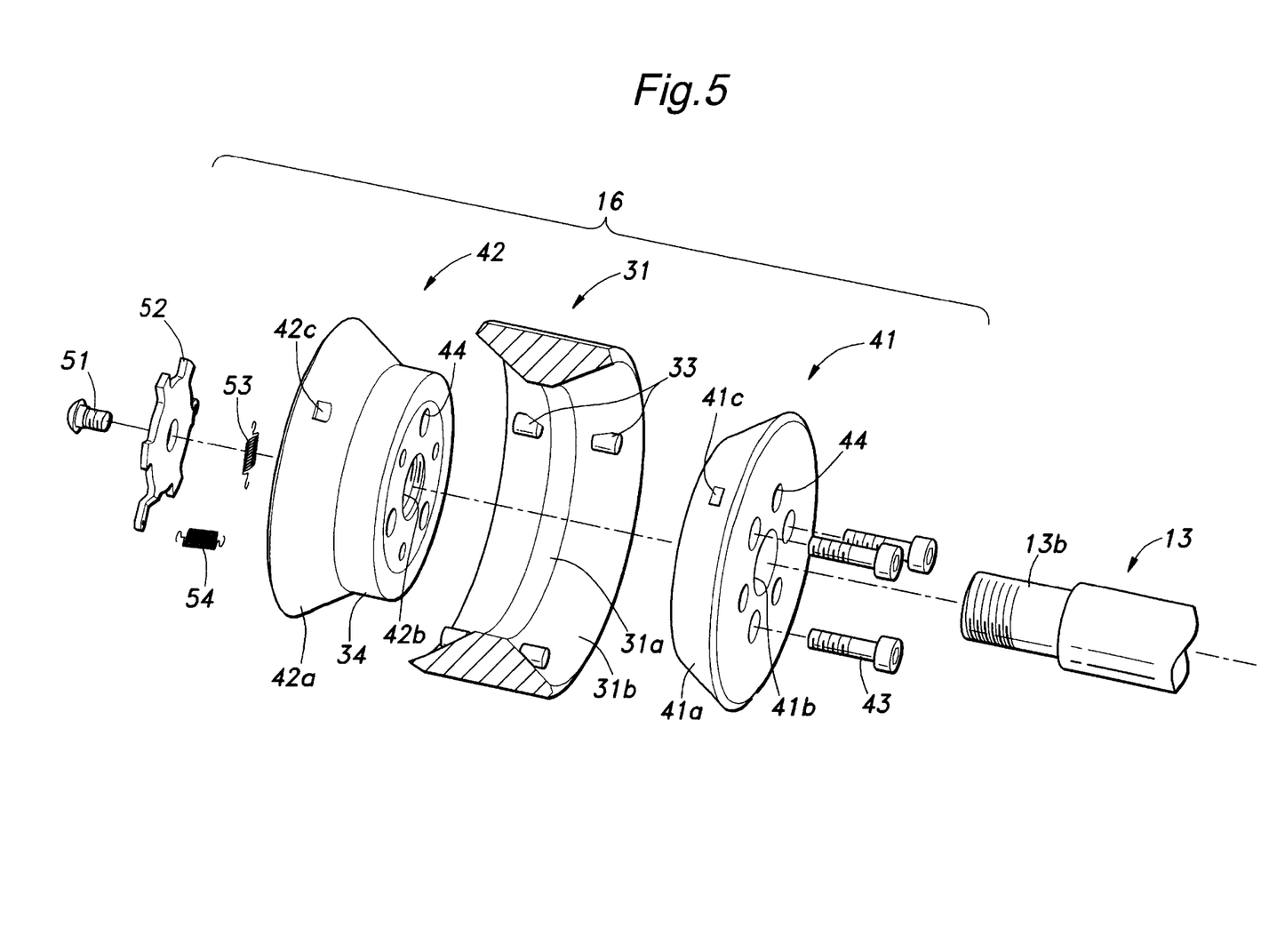
FIG. 5 is an exploded perspective view of the piston of the first embodiment.
Figure 6:
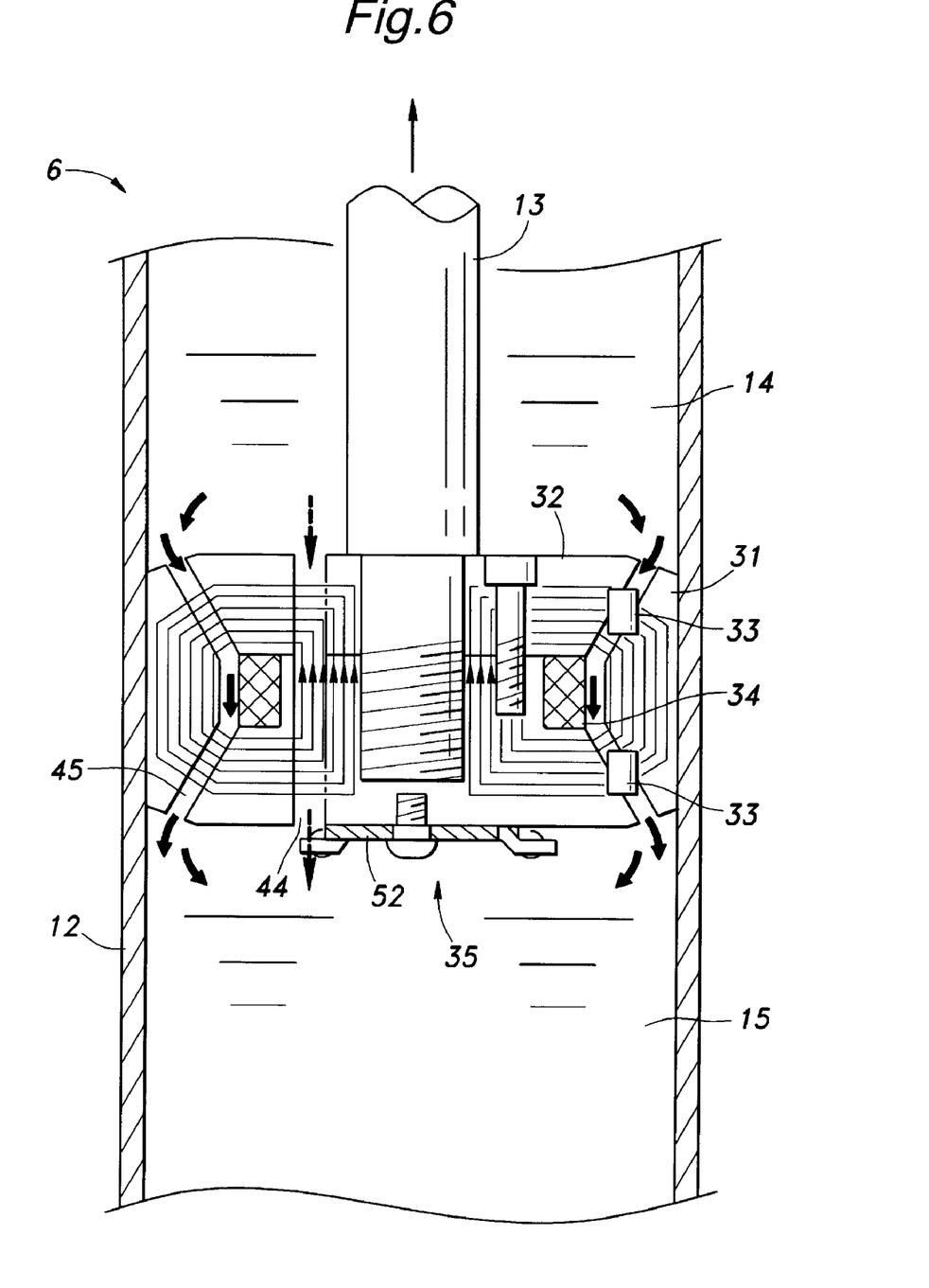
FIG. 6 is a sectional view showing the mode of operation of the first embodiment.

The piston 16 is incorporated with a magnetizable liquid valve (MLV) as will be described hereinafter. As shown in FIGS. 3 to 5, the piston 16 comprises an outer yoke 31 having an outer circumferential surface slidably engaging the inner circumferential surface of the cylinder 12, an inner yoke 32 coaxially disposed inside the outer yoke 31, six gap spacers 33 interposed between the outer yoke 31 and inner yoke 32, a MLV coil 34 received in an annular groove defined in an axially middle part of the inner yoke 32 and a temperature sensitive shutoff valve 35 provided on the lower surface of the inner yoke 32.

The outer yoke 31 is made of magnetic material such as ferrite, and is provided with a straight cylindrical outer circumferential surface and a profiled inner circumferential surface including a short straight cylindrical surface 31a having a relatively small diameter and a pair of diverging conical surfaces 31b and 31c extending upward and downward, respectively, from the short straight cylindrical surface 31a.

The inner yoke 32 is similarly made of magnetic material, and consists of two parts or a first inner yoke part 41 and a second inner yoke part 42 which are joined to each other by three threaded bolts passed into corresponding axial holes formed in the first inner yoke part 41 and threaded into corresponding threaded holes formed in the second inner yoke part 42. The first inner yoke part 41 is provided with a central axial smooth bore 41b and the second inner yoke part 42 is provided with a central axial threaded bore 42b so that the inner end of the piston rod is passed through the smooth bore 41b and threaded into the threaded bore 42b. As shown in FIG. 5, the first inner yoke part 41 defines a tapered surface 41a opposing the diverging conical surface 31b of the outer yoke 31 at a gap s, and the second inner yoke 42 defines a tapered surface 42a opposing the other diverging conical surface 31c of the outer yoke 31 at a gap s. Thus, the inner yoke 32 defines a substantially hourglass-shaped profile including a pair of substantially conical surfaces, and the outer yoke defines a substantially complementary inner circumferential surface opposing the outer profile of the inner yoke at the prescribed gap s. The outer circumferential surface of the outer yoke 31 may be provided with a coating or a ring (not shown in the drawings) made of a low-friction material or the like.

Each gap spacer 33 is made of nonmagnetic material such as aluminum alloy (duralumin) and is cylindrical in shape. Three of the gap spacers 33 are interposed between the upper diverging conical surface 31b of the outer yoke 31 and the tapered surface 41a of the first inner yoke part 41, and the other three of them are interposed between the lower diverging conical surface 31c of the outer yoke 31 and the tapered surface 42a of the second inner yoke part 42, at a regular angular interval in each case. Each gap spacer 33 is retained in position by recesses formed in the corresponding diverging conical surfaces of the outer yoke 31 and the corresponding tapered surface of the inner yoke 32. Each recess is complementary in shape to the part of the gap spacer 33 received in the recess when the axis of the gap spacer 33 is disposed in parallel with the axial line of the cylinder 12.

Therefore, after placing the gap spacers 33 in the recesses formed in the corresponding diverging conical surfaces of the outer yoke 31, for instance, by using a bonding agent or the like, the first inner yoke part 41 and second inner yoke part 42 may be axially joined to each other by using the threaded bolts 43. This not only joins the two parts 41 and 42 of the inner yoke 32 to each other but also keeps the gap spacers 33 clamped in position.

Thus, three arcuate flow passages 45 having a width s are formed between the inner yoke 32 and outer yoke 31 along a common circle and separated from one another by the gap spacers 33. Additionally, three bypass passages 45 are passed axially through the inner yoke 32 at a regular angular interval along a common concentric circle.

The MLV coil 34 is formed by winding coil wire circumferential along the annular groove, and is molded in resin. The outer circumferential surface of the coil 34 opposes the straight cylindrical surface of the outer yoke 31 at a gap s. Therefore, when the coil 34 is energized by electric current supplied by ECU 9 via lead wires not shown in the drawings, a magnetic field is created in the inner yoke 32 and outer yoke 31, and in particular magnetic flux passes across the gap or the flow passages 45 through which MRF flows.

As shown in FIG. 4, the temperature sensitive shutoff valve 35 comprises a disk valve member 52 pivotally supported on the bottom end of the second inner yoke 42 in a coaxial relationship by a pivot screw 51, a shape memory coil spring (tension coil spring) 53 that urges the valve member 52 in counter clockwise direction as seen in FIG. 4 and a bias coil spring (tension coil spring) 54 that urges the valve member 52 in clockwise direction. The valve member 52 is provided with three radial extensions 52a extending radially outward from the outer peripheral edge of the valve member 52 at a regular angular interval, and three additional similar but somewhat smaller radial extensions that include a pair of engagement pieces 52b and 52c for engaging the corresponding ends of the coil springs 53 and 54 and a stopper piece 52d for limiting the range of the angular movement of the valve member 52 in cooperation with a pair of pins 56 extending axially from the bottom end surface of the second inner yoke 42. The first three radial extensions 52a are positioned such that the bypass passages 44 are fully open when the valve member 52 has fully turned in clockwise direction, and are fully closed when the valve member 52 has fully turned in counter clockwise direction.

The material (titanium-nickel alloy in the illustrated embodiment) of the shape memory coil spring 53 is selected such that the coil spring 53 contracts and turns the valve member 52 against the spring force of the other coil spring 54 when the surrounding temperature rises above a prescribed temperature (30 to 40° C., for instance). Thereby, the bypass passages 44 are fully closed. When the temperature is lower than the prescribed temperature, the spring force of the coil spring 54 is dominant, and the bypass passages 44 are fully open. Numeral 55 denotes pins that extend axially from the bottom end surface of the second inner yoke 42 to engage the other ends of the coil springs 53 and 54.

In the damper 6 illustrated in FIGS. 3 to 6, as opposed to the case where end plates are used for retaining the inner core in place, the axial length and weight of the piston can be reduced, and this contributes to the improvement in the dynamic response of the damper as well as the compact design of the damper 6. When desired (for a recycling purpose, for instance), the inner yoke parts 41 and 42 and the outer yoke 31 can be easily taken apart simply by unfastening the threaded bolts 43.

When the vehicle is in motion, the ECU 9 determines a target damping force for each of the wheels according to the accelerations of the vehicle obtained from a fore-and-aft G sensor, a lateral G sensor and a vertical G sensor, the vehicle speed obtained from a vehicle speed sensor, the rotational speed of each wheel and other data, and supplies a corresponding electric current to each MLV coil 34. The electric current causes a change in the viscosity of the MRF flowing through the annular passage 45, and this causes a corresponding increase or decrease of the damping force of the damper 6. In the disclosed embodiment, because the axially middle part of the outer yoke 31 that defines a straight cylindrical inner circumferential surface is provided with a relatively large thickness, and the outer yoke 31 and inner yoke 32 oppose each other via the tapered surfaces 31b, 31c, 41a and 42a, a relatively great magnetic field can be generated in the gap between the outer yoke 31 and inner yoke 32 without suffering from a magnetic saturation within the piston, in particular the outer yoke 31.

When the ambient temperature is low such as when the vehicle is parked for a long period of time in a cold weather, the temperature of the MRF in the damper becomes low, and the viscosity of the MRF increases. Therefore, when the damper control is performed without taking into consideration of the temporarily high viscosity of the MRF, the MRF encounters a higher flow resistance than is initially anticipated, and the actual damping force of the damper 6 becomes substantially greater than the target damping force. In the illustrated embodiment when the temperature of the MRF is low, the valve member 52 of the temperature sensitive shutoff valve 35 is turned fully in clockwise direction under the spring force of the bias spring 54 and the extensions 52a expose the bypass passages 44 as illustrated in FIG. 4. Therefore, the MRF is allowed to flow between the upper chamber 14 and lower chamber 15 not only through the annular passage 45 (as indicated by solid line arrows in FIG. 6) but also through the bypass passages 44 (as indicated by broken line arrows in FIG. 6) so that the MRF encounters a relatively low resistance, and the damping force is prevented from becoming excessively greater. Therefore, the damping force of the damper 6 can be controlled at an appropriate level even when the surrounding temperature is low.

Figure 7:
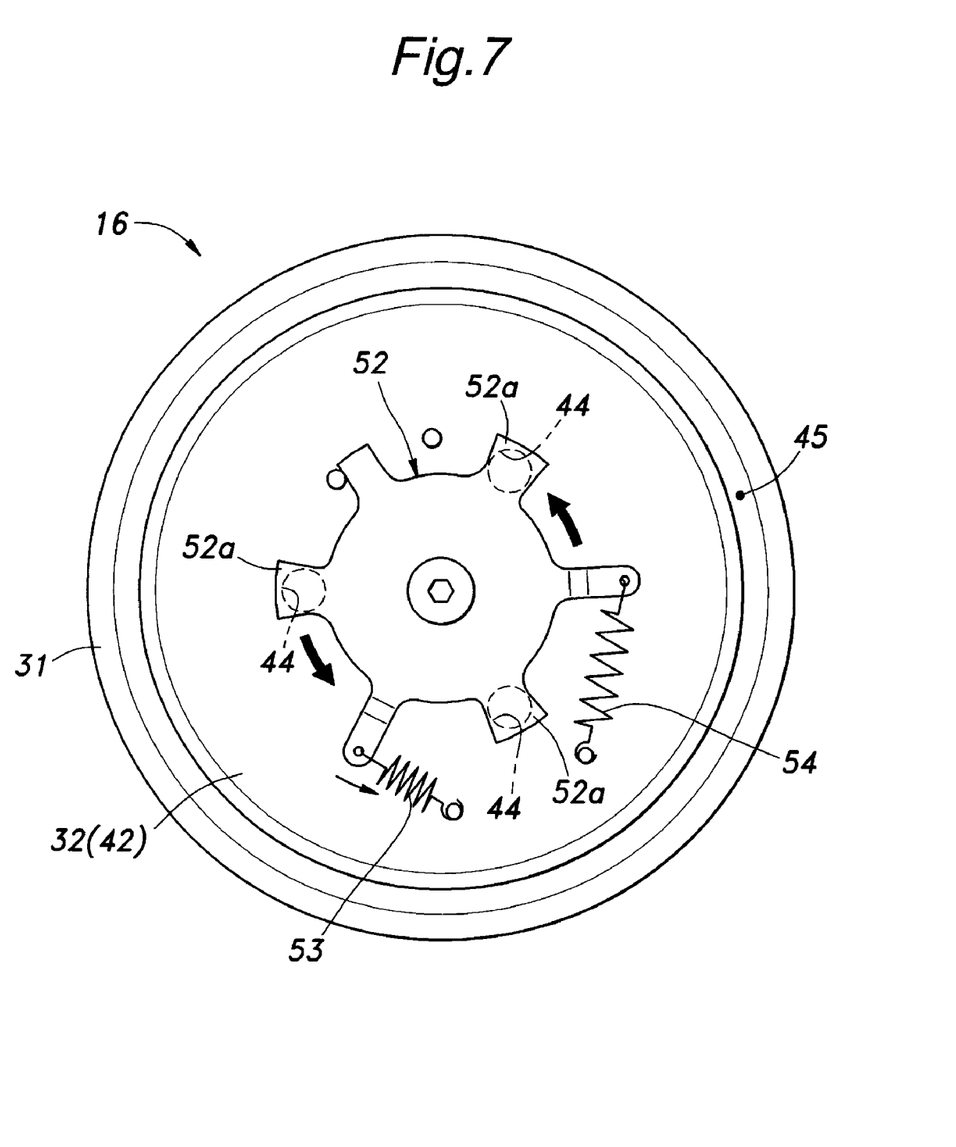
FIG. 7 is a bottom view of the piston of the first embodiment when the temperature sensitive valve is closed.

As the vehicle travels for a certain period of time, the resulting extending and retracting movement of the damper 6 causes an increase in the temperature of the MRF owing to the friction between the cylinder 12 and piston 16 and the constant stirring of the MRF by the movement of the piston 16. When the MRF temperature reaches a prescribed temperature, the shape memory coil spring 53 contracts and causes the temperature sensitive shutoff valve 35 to be closed by turning the valve member 52 fully in counter clockwise direction against the spring force of the bias spring 54 and blocking the bypass passages 44 with the extensions 52a as illustrated in FIG. 7. Therefore, the MRF is allowed to flow across the piston 16 only through the annular flow passage 45 (while the bypass passages 44 are closed), and this enables a normal damping force control.

Figure 8:
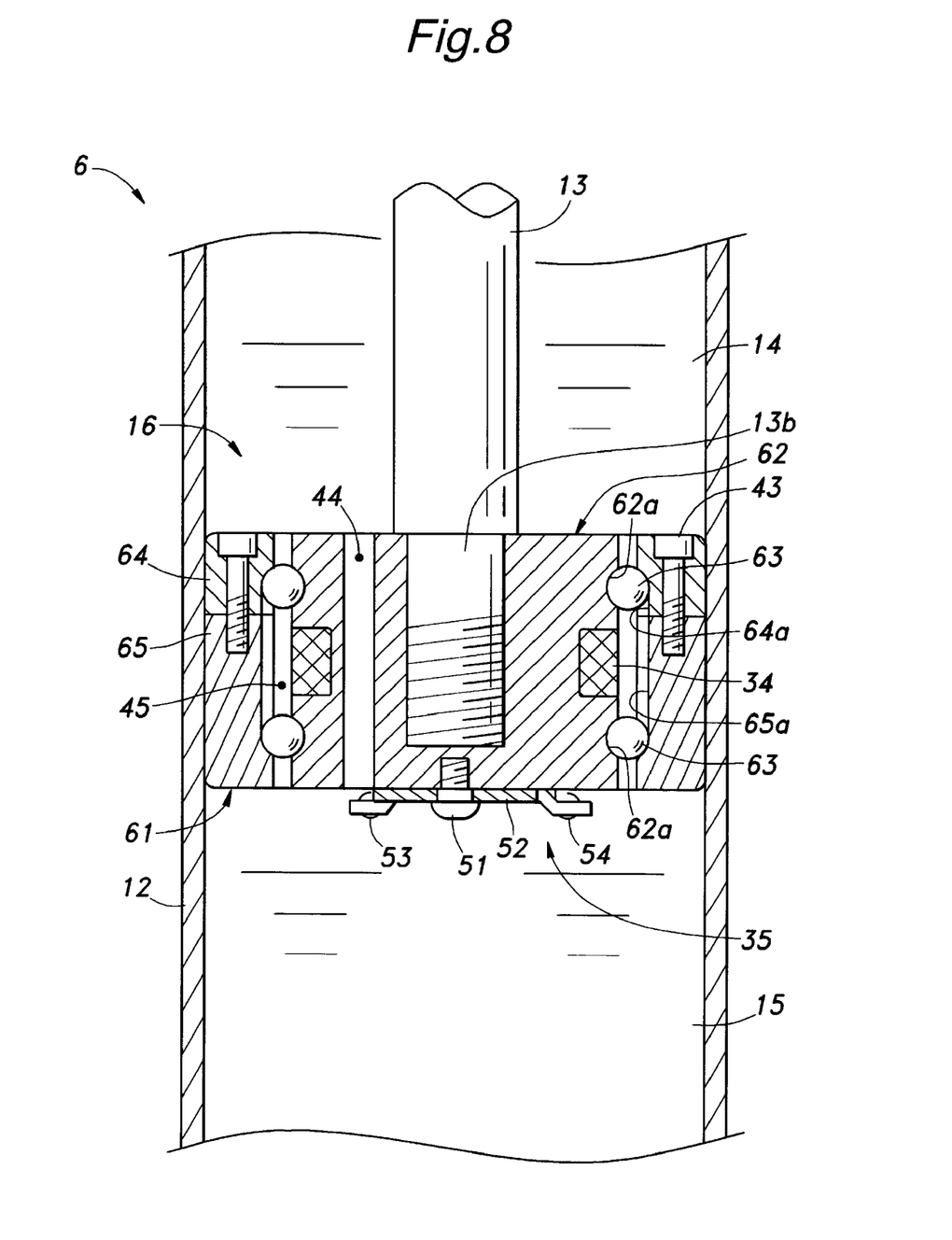
FIG. 8 is a view similar to FIG. 3 showing a second embodiment of the present invention.

FIG. 8 shows a second embodiment of the present invention in which the parts corresponding to those of the previous embodiment are denoted with like numerals. The damper 6 illustrated in FIG. 8 is similar to that of the first embodiment, but differs therefrom in the structure of the piston 16. More specifically, the piston 16 comprises a cylindrical hollow outer yoke 61, a cylindrical solid inner yoke 62 and eight spherical gap spacers 63. The outer yoke 61 consists of a first outer yoke part 64 and a second outer yoke part 65 that are joined axially to each other by four threaded bolts 43 extending in the axial direction. The inner circumferential surface of the outer yoke 61 is formed with four axial grooves 64a and 65a arranged at a regular angular interval and the inner yoke 62 is formed with part spherical recesses 62a at positions corresponding to the terminal ends of the four axial grooves 64a and 65a. Each of the axial groove of the outer yoke 61 consists of a first section 64a formed in the first outer yoke part 64 and a second section 65a formed in the second outer yoke part 65 which are aligned to each other in the axial direction. Each terminal end of each axial groove is formed with a part spherical surface which jointly with the corresponding recess 62a of the inner yoke 62 forms a complementary surface that snugly receives the spherical gap spacer 63.

Therefore, after placing the gap spacers 63 either in the part spherical recesses 62a, the two parts 64 and 65 of the outer yoke 61 may be axially joined to each other by using the threaded bolts 43. This not only joins the two parts 64 and 65 of the outer yoke 61 to each other but also keeps the gap spacers 63 clamped in position.

This damper 6 operates similarly as the first embodiment, and the second embodiment has the advantage of simplifying the manufacture of the outer yoke 61, in addition to the advantages of the first embodiment.

Figure 9:
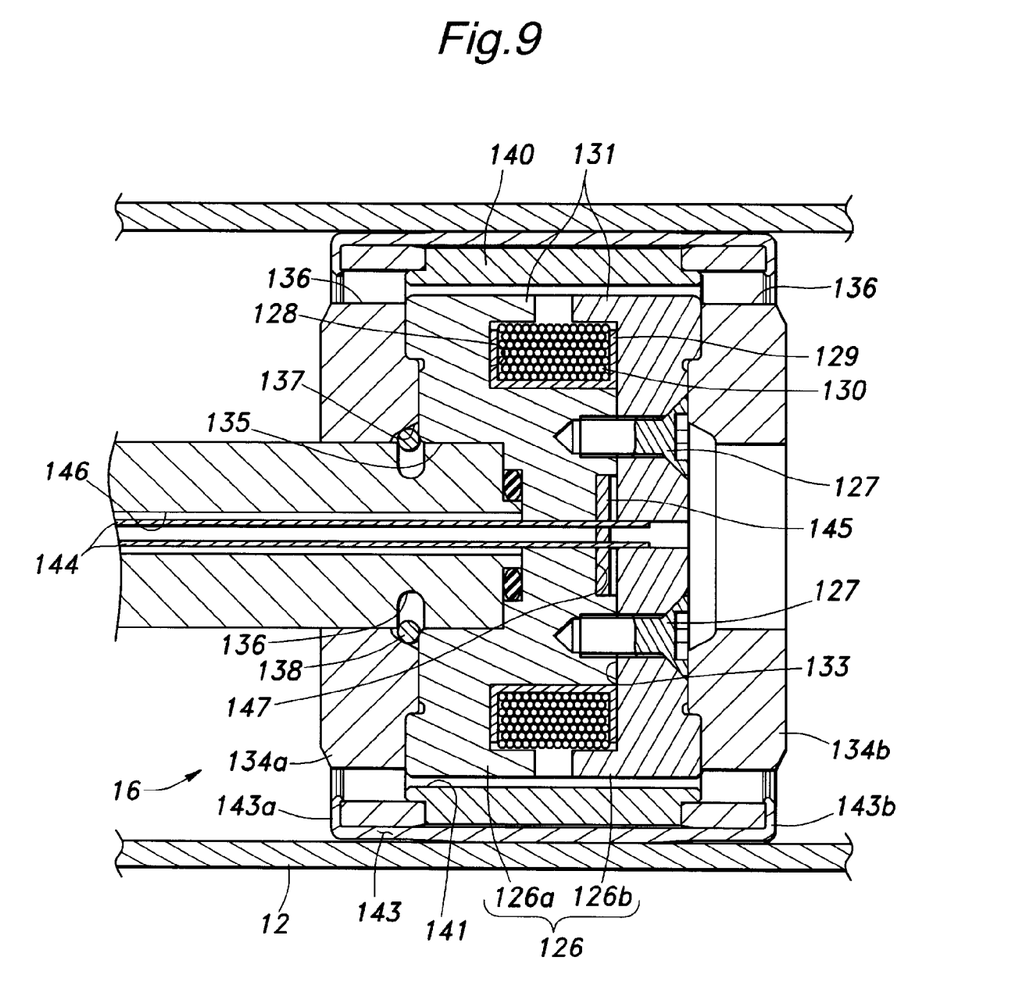
FIG. 9 is a view similar to FIG. 3 showing a third embodiment of the present invention.

FIG. 9 shows a third embodiment of the present invention. The piston 16 comprises a substantially solid cylindrical inner yoke 126 made of magnetic material, and an end of the piston rod 13 is received in a hole 135 formed centrally in an axial end of the inner yoke 126. The inner yoke 126 consists of axially separated two parts 126a and 126b which are integrally and axially joined to each other by four threaded bolts 127 passed into the inner yoke 126 from the axial end remote from the piston rod 113.

The outer circumferential surface of the inner yoke 126 is formed with an annular groove 128 in an axially central part thereof, and a coil 130 is received therein via a coil bovine 129. In this case also, the coil 130 is molded in resin. In this case, the coil 130 consists of a coil wound in the circumferential direction. The outer peripheral part of the annular groove 128 is provided with axial extensions 131 formed by extending parts of the inner yoke 126 from the both axial ends into the peripheral part of the coil 130. In the illustrated embodiment, the axial extensions 131 extend from the both axial ends in a symmetric manner. The outer circumferential surface of the inner yoke 128 generally defines a cylindrical surface having a fixed radius, and the parts thereof located on either axial side of the annular groove 128 form pole pieces 32a and 32b.

The parting plane between the two parts of the inner yoke 126 is located on the same plane as a side surface of the annular groove 128 remote from the piston rod 13. An end plate 134 (134a, 134b) made of non-magnetic material is placed on each end surface of the inner yoke 126, and the piston rod 13 is passed through a central opening of the end plate 134a facing the piston rod 13. Each end plate 134 is formed with four arcuate slots 136 extending along a common concentric circle adjacent to the outer peripheral edge thereof at a regular angular interval.

A cylindrical flux ring or outer yoke 140 is interposed between the peripheral edges of the two ends plates 134 so that the inner circumferential surface of the outer yoke 140 opposes the outer circumferential surface of the inner yoke 126 at a prescribed gap 141 in a concentric relationship. The outer circumferential surface jointly defined by the outer yoke 140 and the two end plates 134 and having a fixed radius is covered by a cylindrical piston sleeve 143 (which may be made of non-magnetic material), and each axial end 143a, 143b thereof is crimped onto the outer peripheral part of the corresponding end plate 134 so that the two end plates 134, inner yoke 126 and outer yoke 140 are held in a fixed manner.

The peripheral part of the central opening of the end plate 134 is formed with a beveled portion 137 that faces inwardly toward the center of the piston 16 and the corresponding outer circumferential surface of the piston rod 13 is formed with an annular groove 136, and a C ring 138 is received in an annular recess jointly formed by the beveled portion 137 and annular groove 136 so as to secure the piston rod 13 with respect to the piston 16.

The piston rod 13 is internally provided with an axial bore 146 which coaxially aligns with a similar bore formed in the inner yoke 126. The end surface of the inner yoke part 126a facing the other inner yoke part 126 is formed with a central recess 147 that receives a hermetic seal member 145 therein. Lead wires 144 of the coil 130 are passed through the axial bore 146 of the piston rod 13 and the central bore of the inner yoke 126, and is then sealably passed through the hermetic seal member 145. The lead wires 144 are then passed through a groove (not shown in the drawing) extending radially along the end surface (parting plane 133) of either one of the inner yoke parts 126a and 126b, and reach the coil 130. An O ring is provided in the bottom part of the hole 135 to seal off the central bore 144 of the piston rod 13 from the MRF. The peripheral part of the hermetic seal member 145 is welded to the corresponding part of the inner yoke 126 to achieve a liquid tight seal for a similar purpose.

The mode of operation of this damper is described in the following. When the corresponding wheel moves relatively to the vehicle body owing to the movement of the vehicle, this displacement is transmitted to the piston 16 via the piston rod 13, and causes a relative displacement between the piston 16 and cylinder 12. As a result, the volumes of the two chambers 14 and 15 change, and the MRF is forced to flow through the flow passage formed by the arcuate slots 136 of one of the end plates 134a, the gap 141 between the inner yoke and outer yoke and the arcuate slots 136 of the other end plate 134b. When the coil 130 is not energized, the MRF is allowed to flow without encountering any significant resistance, and produces a relatively low damping force which is substantially proportional to the relative speed between the piston 16 and cylinder 12. When the coil 130 is energized, the magnetic field produced in the gap 141 applies a relatively strong flow resistance to the MRF that flows through the gap 141, and this produces a relatively high damping force which is substantially proportional to the relative speed between the piston 16 and cylinder 12. Thus, by supplying controlled electric current to the coil 130, a desired damping control can be achieved.

Figure 10:
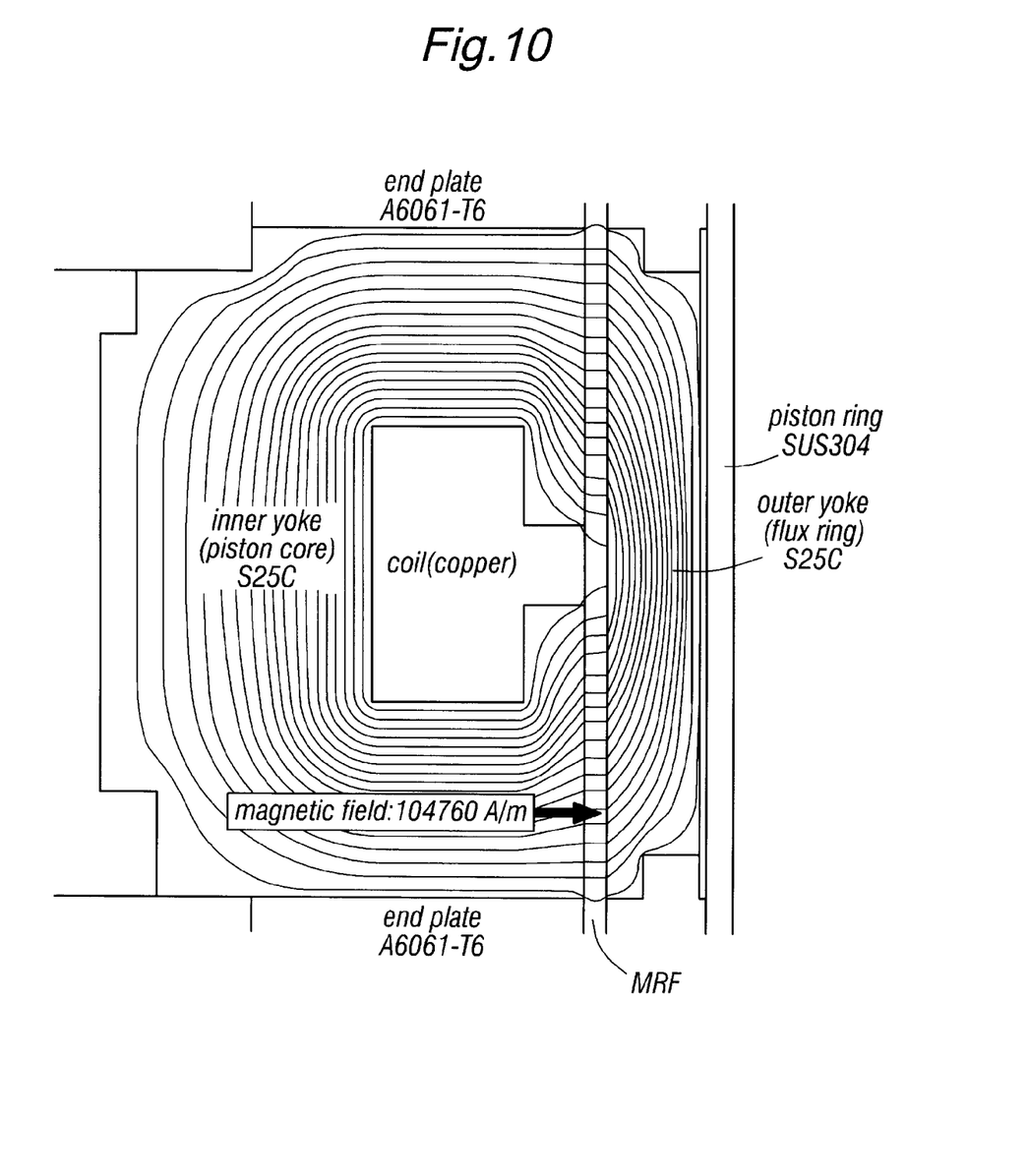
FIG. 10 is a diagram showing the distribution of magnetic flux in the piston of the third embodiment.

FIG. 10 shows the magnetic flux generated between the inner yoke 126 and outer yoke 140 when the coil 130 is energized. This was obtained by computer simulation. The outer peripheral part of the annular groove 128 receiving the coil 130 was narrowed symmetrically from two sides by the axial extensions 131, and the coil 130 was received relatively deep into the annular groove 128 away from the outer circumferential surface of the inner yoke 126. In this case, the inner and outer yokes were made of S25C, the coil was made of copper, the piston sleeve was made of SUS 304, the end plates were made of A6061-T6, and the coil had 50 turns. Electric current of 5 A was supplied to the coil. The magnetic flux lines extended substantially in parallel to each other in the gap 141 between the inner yoke 126 and outer yoke 140 substantially over the entire axial length of the piston 16.

Figure 11:
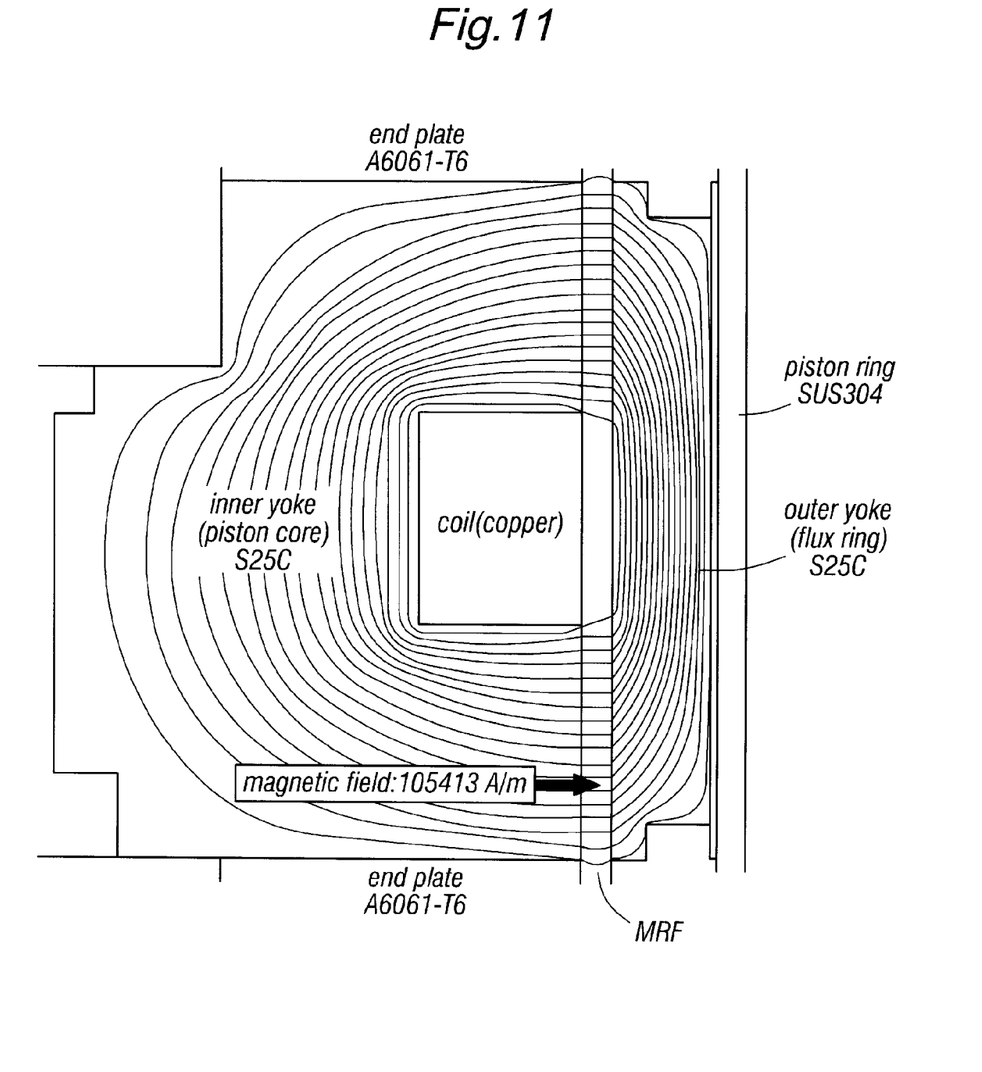
FIG. 11 is a view similar to FIG. 10 showing the distribution of magnetic flux in the piston of a conventional variable damper.

FIG. 11 shows the magnetic flux generated between the inner yoke 126 and outer yoke 140 of a conventional piston 16 when the coil 130 is energized. This conventional piston was similar to that of the present invention except for that the annular groove 128 for receiving the coil 130 had a constant width over the entire depth thereof and had a somewhat greater axial length. Similarly as in FIG. 10, the magnetic flux lines extended substantially in parallel to each other in the gap between the inner yoke and outer yoke, but the part corresponding to the annular groove 128 had a relatively low magnetic flux density. It means that the portion corresponding to the width of the annular groove 128 of the entire axial length of the piston 16 is magnetically ineffective. On the other hand, in the case of the present invention illustrated in FIG. 10, the portion of the axial length of the piston 16 which is magnetically ineffective is minimized.

In this case, if the width of the outermost part of the annular groove 128 is made excessively small, a magnetic short-circuiting occurs, and this reduces the overall magnetic flux that extends from the inner yoke to the outer yoke so that an adequate damping force is not obtained. Conversely, if the width of the outermost part of the annular groove 128 is made excessively great, the magnetically ineffective portion increases, and this prevents the damping force in de-energized state to be reduced owing to the need for a relatively large axial length of the piston. Therefore, an optimum opening width may be experimentally or otherwise obtained, and use it for the actual structure.

In the third embodiment, because the axial extensions 131 extended symmetrically from either side of the annular groove 128, a strong magnetic field can be produced in the inner yoke 126 and outer yoke 140 in a highly uniform manner, and high magnetic efficiency can be achieved. However, if necessary, one of the axial extensions 131 may be longer than the other or may even extend from only one side of the annular groove 128 without departing from the spirit of the present invention.

Figure 12:
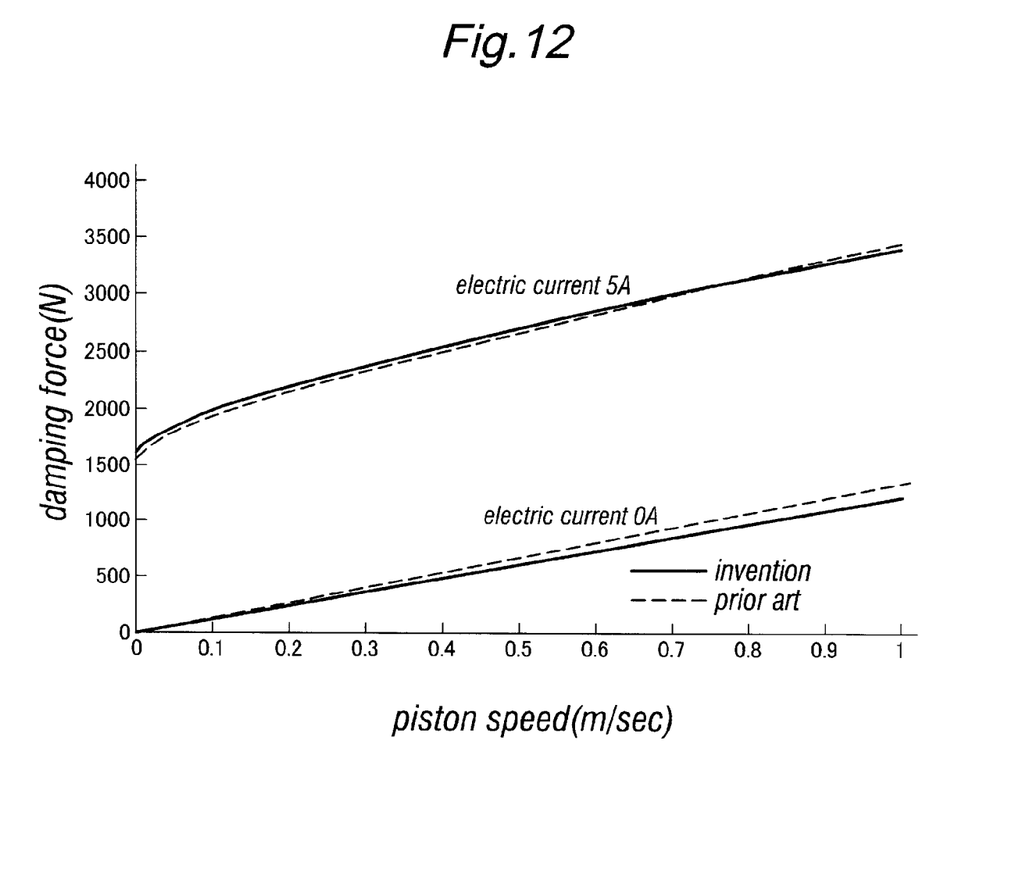
FIG. 12 is a graph comparing the relationships between the piston speed and damping force of the third embodiment and the conventional damper.

FIG. 12 compares the damping forces that are produced from the dampers illustrated in FIGS. 10 and 11 when electric currents of 0 A and 5 A are supplied while other conditions are kept to be the same as much as possible. This graph shows that the damper of the present invention can be produce a substantially lower damping force than the conventional damper when no electric current is supplied (electric current 0 A), particularly in the region of high piston speeds. When electric current is supplied (electric current 5 A), the damping force is somewhat increased in the region of low piston speeds. As it is desired to increase the variable range and minimize the damping force when the coil is de-energized for a favorable control of a wheel suspension system, the illustrated embodiment is highly suitable for use in a wheel suspension system Although the present invention has been described in terms of preferred embodiments thereof, it is obvious to a person skilled in the art that various alterations and modifications are possible without departing from the scope of the present invention which is set forth in the appended claims. For instance, the damper of the present invention is suitable for use not only in a rear wheel suspension system but also in a front wheel suspension system. Also, the parting plane of the two parts of the inner yoke or outer yoke is not necessarily required to be selected as exemplified in the illustrated embodiments, but may be selected freely with respect to its axial location. If the parting plane of an inner yoke coincides with the middle plate of the coil, the two parts of the inner yoke can be formed as substantially identically shaped members so as to simplify the manufacturing and stocking of the inner yoke. The parting plane is not even required to be flat according to the broad concept of the present invention, but may consist of an irregular plane.

The contents of the original Japanese patent applications on which the Paris Convention priority claim is made for the present application, as well as those of the prior art references mentioned in the present application are hereby incorporated in this application by reference. Also, one feature of a certain embodiment may be incorporated into another embodiment without departing from the spirit of the present invention.

The invention claimed is:

1. A variable damper, comprising:
   a cylinder filled with magnetic fluid or magneto-rheological fluid therein and having an end connected to one of a vehicle side member and a wheel side member;
   a piston slidably received in the cylinder to separate an interior of the cylinder into two chambers and provided with a flow passage communicating the two chambers; and
   a piston rod extending out of an end of the cylinder remote from the one end thereof, and having an outer end connected to the other of the vehicle side member and the wheel side member and an inner end connected to the piston;
   the piston comprising a cylindrical outer yoke defining an outer peripheral part of the piston, an inner yoke coaxially received in the outer yoke at a prescribed gap and a coil retained in the inner yoke to provide a magnetic flux extending across the gap, the gap providing at least a part of the flow passage;
   wherein the inner yoke comprises at least two parts that are joined to each other in an axial direction; and the two parts of the inner yoke jointly define an hourglass-shaped profile including a pair of substantially conical surfaces while the outer yoke defines a substantially complementary inner circumferential surface opposing the outer profile of the inner yoke at a prescribed gap.

2. The variable damper according to claim 1, wherein the piston includes a plurality of discrete gap spacers that are interposed between the inner yoke and outer yoke and clamped in position by joining the two parts of the inner yoke.

3. The variable damper according to claim 1, wherein the coil is received in an annular groove defined in an axially middle part of an outer circumference of the inner yoke.

* * * * *

UNITED STATES PATENT AND TRADEMARK OFFICE
CERTIFICATE OF CORRECTION

PATENT NO. : 7,958,979 B2  Page 1 of 1
APPLICATION NO. : 11/954292
DATED : June 14, 2011
INVENTOR(S) : Shigenobu Sekiya et al.

It is certified that error appears in the above-identified patent and that said Letters Patent is hereby corrected as shown below:

Title Page should read:

In Item (30)   Jan. <u>17</u>, 2007   (JP)   2007-<u>007607</u>

Oct. 30, 2007   (JP)   2007-281636

Signed and Sealed this
Twentieth Day of September, 2011

David J. Kappos
*Director of the United States Patent and Trademark Office*